Patented May 22, 1934

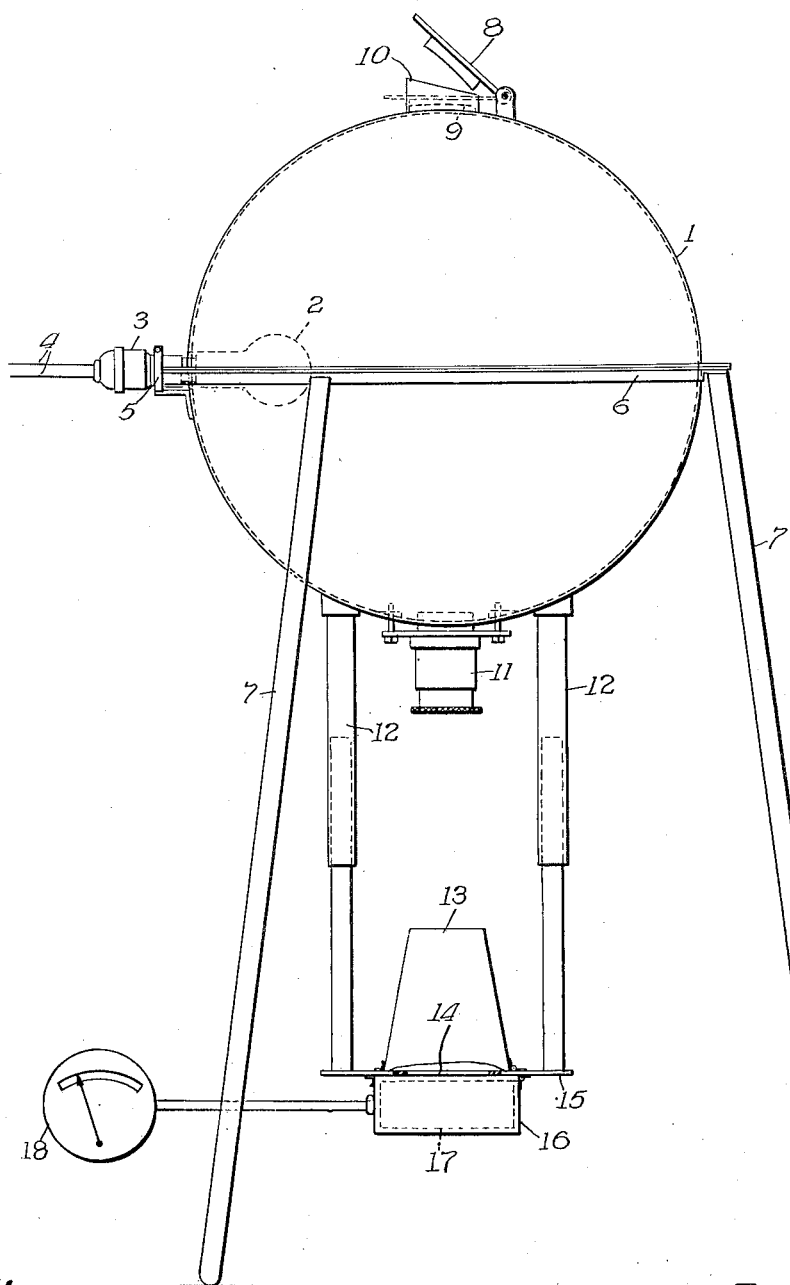

1,960,169

UNITED STATES PATENT OFFICE 1,960,169

METHOD AND APPARATUS FOR MEASURING LIGHT

Virgil A. Schoenberg, Niles Center, Ill.

Application September 9, 1933, Serial No. 688,820

4 Claims. (Cl. 88—14)

This invention relates to instruments and method for determining the nature of materials with reference to the light responsive qualities thereof. A measure of the usefulness of a material for some purposes is frequently possible to ascertain through the light reflecting, absorbing or transmitting capacity of the material. This statement applies to the separate colors of the spectrum as well as to white light.

In using the instrument, the source may be either a standard white light or one which delivers a particular color illumination only.

The objects of the invention are to provide an improved instrument of this class which may be used for example in the grading of cloth, paper, and other solid materials or liquids wherein color or light reflection and transmission is a suitable index. It is, for example, possible by the use of this instrument to grade paper according to the glossiness of its surface; or to definitely determine the quality of work performed by a laundry washing machine; it will indicate the presence of impurities and the approximate amount thereof in semi-transparent materials such as paper, cloth, glass, etc.

My new method will be apparent from the disclosure of the operation of the device.

The construction is illustrated in the accompanying drawing which is a diagram illustrating the instrument as it would appear in side elevation.

The principal elements of the construction are a light enclosing means preferably of hollow spherical form, the inner surface being prepared for maximum light reflection. The enclosure may be of metal or glass rendered opaque to light waves, and made in halves which fit together and each having a central aperture, one for receiving a lens holder and the other for receiving a specimen for examination, reflected light from which passes through the lens system, and onto a photoelectric cell.

An electric lamp furnishes the light and is mounted inside the hollow sphere at one side so as not to send any direct rays through the portion of the lens which transmits the image of the specimen under examination. If the specimen receiving aperture of the sphere is open there is nothing there to reflect rays of light through the lens system and therefore a dark field will appear on the receiving photo-electric cell, assuming that the instrument is in a location where the surrounding light is equivalent to ordinary daylight and no intense direct light beams are permitted to pass from the object receiving aperture to the lens.

However, when an object is placed in the specimen aperture it will receive the direct light from the lamp and the reflected light from the inner surface of the light enclosure, and an image of the object will appear on the photo-electric cell surrounded by the dark field. The dark field serves to make the image definite in outline and to contrast it.

The image is transmitted to the photo-electric cell in its natural color values provided the source of light is not screened to transmit only one or some of the colors. The photo-electric cell is sensitive according to the colors transmitted and the total value of the light received and it is directly connected with a galvanometer which is adjusted so that the needle will indicate zero when the dark field only is projected, and move to indicate units of light or color values when the image of a specimen is transmitted into the field.

In the examination of a specimen with reference to some standard specimen, a variation such as may be caused by dirt or change in color tone is detectable by a difference in shift of the galvanometer needle.

The photo-electric cell is generally screened from stray light rays by a hollow frusto-conical guard placed thereon. When a specimen is examined for translucency it is placed between this screen and the lens, and light is provided by closing the specimen receiving aperture with a curved stopper which forms a continuation of the inner light reflecting surface of the hollow light enclosing sphere.

The drawing shows the assembled construction of the light enclosing and reflecting member which may be of metal formed in two parts meeting on the line 1' where each part has an annular flange spun outwardly therefrom.

The inside surfaces of the member 1 are highly burnished or mirrored to reflect to the maximum degree.

The meeting edges 1' are recessed to receive an electric lamp of moderate candle power. The socket 3 of the lamp is connected with a lighting circuit 4 and is held clear of the opening in the light enclosure to permit some ventilation, by a bracket 5.

The flange of the light enclosure rests upon a cast mounting ring 6 having three supporting legs 7. A hinged lid or cover 8 serves to close the circular specimen-receiving opening 9 and is formed to continue the curvature of the inner surface of the sphere 1. A beveled ring 10 is also used at the specimen-receiving aperture 9 to form a rest at the proper angle for a specimen which is to be tested for gloss value. The lens holder 11 fits an aperture opposite the specimen-receiving aperture 9, and it is provided with a short focus projection lens system.

Depending from the sphere 1 near the sides of the lens holder are the telescoping elements 12, which support a plate 15 for adjustment toward and away from the lens holder.

The plate 15 supports on one side the hollow frusto-conical guard 13 over the central circular aperture 14 in the plate. On the opposite side of the plate is a metal housing 16 which carries the photo-electric cell 17. Both the guard 13 and the housing 16 are preferably hinged to the plate and latched thereto in the position indicated in the drawing. A meter or galvanometer 18, or other instrument which may be responsive to the electromotive force generated by the action of light on the cell is directly connected to the terminals of the cell.

The telescoping members which support the cell unit are frictionally or otherwise retained in set position according to the focus desired.

The sphere having its inside surface highly burnished or silvered and having the specimen-receiving opening directly in line with the lens opening, and the lamp being mounted to one side of this line but otherwise midway between the openings, the light from the lamp is directly and by reflection transmitted to both openings, but assuming that there is no reflecting surface in either opening then all light projected therethrough will be at an angle to the axis of the openings, and if intercepted after passing therethrough will be in the form of a ring with an inner disc-shaped dark field. If, however, lid 8 is closed to form a reflecting surface opposite the lens holder 4, the rays of light from this reflecting surface are projected straight through the lenses, and blot out the dark field. If, instead of closing the lid 8, a specimen for examination is placed in the opening 9, it will reflect light rays through the lens system and the image will appear on the photo-electric cell.

An example of the use of the apparatus could be the placing over the opening of a sample having an area equal to or greater than the opening, and with its surface parallel to that of the lens system. A cover is then placed over the opening and the light reflected from the sample is projected by the lens system upon the surface of the photo-electric cell, and the change in the cell output over what would occur with the dark field is indicated by the meter 18. The meter gives a measure of the reflected value of the sample. If there is a variation in color or other characteristics which will affect the reflection, the meter will indicate the difference in the reflection over that obtained from a standard specimen.

In order to measure the gloss or glare of material such as paper, tile, etc., the sample is placed over the removable beveled adapter 10 surrounding the opening 9, to provide the proper angle for reflection. At this angle the sample reflects the maximum amount of light and with the system properly focused it is possible to measure, the value of gloss either of a negative or positive value with reference to a standard.

The conical guard 13 excludes much of the extraneous light and its small end is somewhat smaller than the projected dark field.

In focusing the system a small object insignia is placed over the inside surface of lid 8, which is then closed over the object opening 9. The guard 13 is swung on its hinges out of the way to expose the surface of the cell through an opening in plate 15. The plate with the photo-cell is then adjusted up or down along the telescoping tubes 12 until the approximate focus is obtained on the surface of the cell. The lens 11 is adjusted so as to bring the projected image of the object into sharp focus.

The guard 13 is then swung back and latched in its normal position. This procedure is also used for obtaining the glare value of samples.

To measure the transparency of materials such as glass, cellophane, oils or other liquids, and translucent materials, use is made of a standard which may be either a calcium block or a section having the same reflecting properties as the inside of the sphere, which is placed in the opening 9. This serves for establishing a zero for comparison with the results obtained from a sample placed between the lens system 11 and the guard 13. The light transmitting qualities of the sample are then indicated by the meter to be of a definite value less than the established zero.

Although there is herein disclosed one of the possible accurate means for measuring the surface reflection and light transmitting qualities of materials and liquids, making use of a simple self-generating type of cell, other means may be substituted for the indication of variations in the light values received by the light sensitive element.

Although but one embodiment of this invention is herein shown and described, it will be understood that details of the construction shown may be altered or omitted without departing from the invention as defined by the following claims.

I claim:

1. In a measuring instrument of the class described, a source of light, an enclosure for the light, said enclosure having oppositely disposed openings, the light being to one side of said openings so as not to intercept a reflection from one opening to the other, means for supporting an object at one of said openings, and a lens fitted to the other of said openings, said enclosure having an interior reflecting surface formed to reflect light rays from said source at various angles toward said object opening, a photo-electric cell supported outside of said enclosure for the light in line with the lens and the object opening, means for altering the focus between said lens and photo-electric cell, means for indicating the electric effect of light passing through said lens and engaging the cell, and a hollow frusto-conical shell between the photo-electric cell and the lens.

2. In a measuring instrument of the class described, a source of light, an enclosure for the light, said enclosure having oppositely disposed openings, the light being to one side of said openings so as not to intercept a reflection from one opening to the other, means for supporting an object at one of said openings, and a lens fitted to the other of said openings, said enclosure having an interior reflecting surface formed to reflect light rays from said source at various angles toward said object opening, a photo-electric cell supported outside of said enclosure for the light in line with the lens and the object opening, means for indicating the electric effect of light passing through said lens and engaging the cell, and a hollow frusto-conical shell between the photo-electric cell and the lens.

3. In a measuring instrument of the class described, a source of light, an enclosure for the light, said enclosure having oppositely disposed openings, the light being to one side of said openings so as not to intercept a reflection from one opening to the other, means for supporting an object at one of said openings, and a lens fitted to the other of said openings, said enclosure having an interior reflecting surface formed to reflect light rays from said source at various angles toward said object opening, a photo-electric cell supported outside of said enclosure for the light in line with the lens and the object opening, said photo-electric cell connected to a meter having a scale with two fixed values, one when the image in said object opening is open air, the other being the value when a manganese carbonate block is placed in said opening.

4. The method of measuring by electrical means the reflecting value of objects which comprises determining the effect of the object opening of an internally illuminated integrating sphere when such opening is unobstructed, determining the reflecting effect when a standard is placed in said opening, establishing a scale with the determined values as fixed points and determining the reflecting values of an unknown placed in said opening by the position between said points on said scale that its effect produces.

VIRGIL A. SCHOENBERG.